(12) United States Patent
Atarashi

(10) Patent No.: US 7,317,677 B2
(45) Date of Patent: Jan. 8, 2008

(54) SEMICONDUCTOR LASER LIGHT SOURCE DEVICE AND OPTICAL PICKUP DEVICE

(75) Inventor: Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 575 days.

(21) Appl. No.: 10/926,309

(22) Filed: Aug. 26, 2004

(65) Prior Publication Data

US 2005/0047315 A1  Mar. 3, 2005

(30) Foreign Application Priority Data

Aug. 29, 2003 (JP) ............................. 2003-308127

(51) Int. Cl.
*G11B 7/00* (2006.01)

(52) U.S. Cl. .................... 369/120; 369/112.01

(58) Field of Classification Search ........... 369/112.01, 369/112.02, 112.1, 120, 121, 122
See application file for complete search history.

(56) References Cited

U.S. PATENT DOCUMENTS

| | | | |
|---|---|---|---|
| 5,059,003 A * | 10/1991 | Haus et al. ................ | 359/243 |
| 6,120,191 A | 9/2000 | Asakura et al. | |
| 6,665,118 B2 * | 12/2003 | Yamaguchi et al. ........ | 359/453 |
| 6,922,383 B2 * | 7/2005 | Sakata et al. ............ | 369/53.26 |
| 7,091,271 B2 * | 8/2006 | James et al. ............... | 524/430 |
| 7,099,261 B2 * | 8/2006 | Yoshida et al. ............ | 369/121 |

FOREIGN PATENT DOCUMENTS

| | | |
|---|---|---|
| JP | 8-179198 | 7/1996 |
| JP | 11-142696 | 5/1999 |
| JP | 2001-305325 | 10/2001 |
| JP | 2002-308933 | 10/2002 |
| JP | 2002-308964 | 10/2002 |
| JP | 2002-309040 | 10/2002 |

OTHER PUBLICATIONS

Günther Schmid et al., "A Route to Boron Nitride via New BN Percursors," Advanced Materials, vol. 4, 1992, pp. 494-496.

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An semiconductor laser light source apparatus includes: a semiconductor laser oscillator for emitting a laser beam; and a lens for transmitting the laser beam emitted by the semiconductor laser oscillator, wherein the lens comprises a light transparent material in which microparticles are dispersed into a plastic resin and have a size of the transmitting laser beam wavelength or below.

14 Claims, 3 Drawing Sheets

SEMICONDUCTOR LASER LIGHT SOURCE DEVICE AND OPTICAL PICKUP DEVICE

BACKGROUND OF THE INVENTION

The present invention relates to a semiconductor laser light source device, and in particular, to a semiconductor laser light source device that is preferably incorporated in a semiconductor laser module that is used for optical communication or optical measurement and conducts optical coupling between a laser beam and an optical fiber.

As a semiconductor laser module, there exists one that converges a laser beam emitted from a semiconductor laser light source through and thereby forms images on an end of incidence of a fiber. There is in existence one (Patent Document 1) wherein, in the semiconductor laser module of this kind, a shift of focus caused by changes of oscillation wavelength of a semiconductor laser oscillator resulted from temperature changes and a shift of focus caused by changes of refractive index resulted from temperature changes of the light converging lens cancel each other, by forming a diffractive ring-shaped zonal structure on at least one surface of the light converging lens, or by providing a flat sheet lens on which a diffractive ring-shaped zonal structure is formed, separately from the light converging lens, and thereby, fluctuations of output from a fiber can be controlled.

(Patent Document 1)
TOKKAIHEI No. 11-142696

However, in the semiconductor laser module stated above, it is necessary to form, on the light converging lens, a diffractive ring-shaped zonal structure for temperature compensation, which requires high technologies for making of the light converging lens, and a loss of light caused by the diffractive ring-shaped zonal structure cannot be avoided. Further, when the diffractive ring-shaped zonal structure for temperature compensation is formed on the light converging lens, it is difficult to provide another function such as correction of chromatic aberration to the diffractive ring-shaped zonal structure of this kind.

In the semiconductor laser module, when the flat sheet lens equipped thereon with the diffractive ring-shaped zonal structure is provided separately from the light converging lens, the manufacturing cost is raised by an increase of the number of parts, and a loss of an amount of light caused by the flat sheet lens turns out to be reckoned with.

With the background mentioned above, an object of the invention is to provide a semiconductor laser light source device wherein it is possible to realize temperature compensation of a light converging lens simply without relying only on a diffractive ring-shaped zonal structure, and it is possible to exhibit other function such as chromatic aberration correction when the diffractive ring-shaped zonal structure is formed.

Another object of the invention is to provide a semiconductor laser light source device wherein it is possible to realize temperature compensation of a light converging lens without increasing the number of parts.

Incidentally, there have been known optical information recording media including CD, and as a technology to improve recording density of the optical information recording media, there is known a technology called Super-RENS system. In this system, an information recording layer that is closer to an optical disc representing an information recording medium has thereon a structure that generates near field light, and this near field light is used to reproduce information to attain high density of information recording. Specifically, there is known a method to generate near field light by means of a system of a microscopic aperture type or a light-scattering type.

SUMMARY OF THE INVENTION

In the invention, a problem to be solved is to attain stability of a light flux, and thereby, to improve efficiencies, even in the case of the recording method stated above.

To solve the aforesaid problem, the semiconductor laser light source device relating to the invention is composed of a semiconductor laser oscillator that emits a laser beam and of a lens that transmits a laser beam emitted from the semiconductor laser oscillator and is formed by using light-transparent material wherein microparticles each being equal to or smaller than a wavelength of the transmitted laser beam are dispersed in plastic resin. Incidentally, the light-transparent material of this kind can be used for the molding which is the same as that for the plastic resin, and the light-transparent material makes it possible to form a lens with a desired shape with a high precision.

In the semiconductor laser light source device mentioned above, a lens that transmits a laser beam is formed by using light-transparent materials wherein microparticles each being equal to or smaller than a wavelength of the transmitted laser beam are dispersed in plastic resin. Therefore, it is possible to adjust a temperature coefficient of the refractive index without lowering the transmittance of the lens material, by adjusting properly the state (for example, material, a size and density) of the microparticles in advance. Thus, image forming characteristics of the lens can be made to have desired temperature-affected characteristics, and thereby, temperature fluctuations of a beam form of a laser beam that is taken out of the semiconductor laser oscillator can be controlled, and temperature-dependency of the image forming position or the like can be kept at the desired state.

BRIEF DESCRIPTION OF THE DRAWINGS

FIG. 2(a) shows an example of the temperature-dependency of an oscillation wavelength of the semiconductor laser oscillator, FIG. 2(b) shows changes of the refractive index in the case of fluctuations of laser beam wavelength, and FIG. 2(c) shows changes of refractive index caused by a rise in ambient temperature.

DETAILED DESCRIPTION OF THE PREFERRED EMBODIMENT

Figure 1:
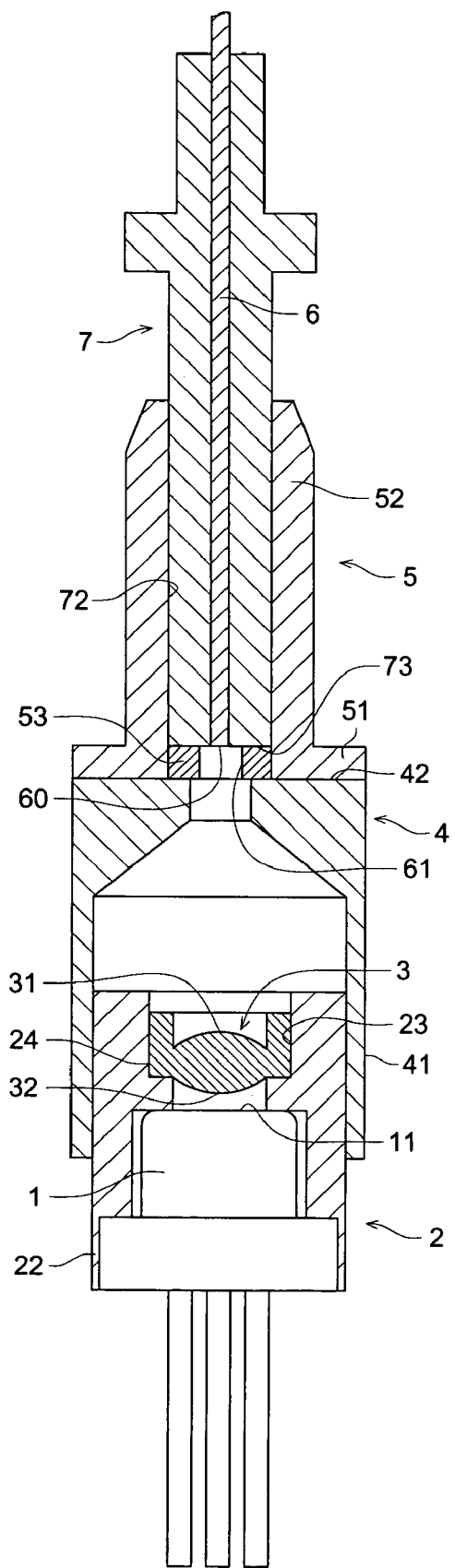
FIG. 1 shows a semiconductor laser module in which a semiconductor laser light source device relating to the First Embodiment is incorporated.

Preferred embodiments of the invention will be explained as follows.

In the specific embodiment of the invention, the lens and the semiconductor laser oscillator both mentioned above are housed in a lens holder to be positioned therein by positioning members provided on an inner wall of the lens holder. In this case, it is possible to control precisely a beam shape of a laser beam taken out of the semiconductor laser oscillator while positioning the lens and the semiconductor laser oscillator simply.

In the specific embodiment of the invention, each of microparticles has a diameter of 30 nanometers or less. In this case, it is possible to provide the image forming characteristics of the lens with desired temperature-affected characteristics, while reducing scattering for laser beams with wavelengths in a wide range including a visible light area.

In another specific embodiment of the invention, a size and density of each of microparticles to be dispersed in the plastic resin are established so that the temperature coefficient of refractive index of the light-transparent material may be a prescribed value. In this case, it is possible to control precisely the temperature coefficient of refractive index of the light-transparent material through adjustment of size and density of microparticles.

In another specific embodiment of the invention, a volume ratio between the plastic resin and the microparticles in the light-transparent material is within a range of 9:1-2:3.

In another specific embodiment of the invention, the temperature coefficient of refractive index of the light-transparent material is established so that a shift of focus caused by refractive index changes and thermal deformation both caused by temperature changes of the lens and a shift of focus caused by changes of oscillation wavelength of semiconductor laser oscillator for temperature changes may be opposite each other in terms of direction. In this case, the shift of focus resulted from the semiconductor laser oscillator can be canceled at a certain level by the shift of focus resulted from the temperature coefficient of the refractive index of the lens, thus, light-converging by the lens may be made to be one with less temperature-dependency.

In another specific embodiment of the invention, the temperature coefficient of refractive index of the light-transparent material is established so that compound shift of focus composed of focus shifts which are opposite each other in terms of direction may be a prescribed allowable value or less, namely, 40 nm or less. In this case, it is possible to reduce fluctuations of image forming positions caused by temperature changes, and to raise stability of operations of the semiconductor laser light source device.

In another specific embodiment of the invention, the temperature coefficient of refractive index of the light-transparent material is established so that the focus shifts which are opposite each other in terms of direction may be canceled each other. In this case, it is possible to make operations of the semiconductor laser light source device to be stable without depending on ambient temperatures.

In another specific embodiment of the invention, the semiconductor laser light source device is further provided with a fixing means that fixes a position of an end of incidence of an optical fiber, and the lens couples a laser beam emitted from the semiconductor laser oscillator with the end of incidence of the optical fiber. In this case, it is possible to couple the laser beam emitted from the semiconductor laser oscillator with the end of incidence of the optical fiber stably despite fluctuations of ambient temperatures.

In another specific embodiment of the invention, the lens has thereon an optical functional surface which further has an optical path difference providing structure. In this case, various types of functions such as chromatic aberration correction can be provided to the optical functional surface of the lens.

In this case, the optical path difference providing structure is one wherein an optical element is divided into ring-shaped zonal structure in a form of concentric circles each having its center on an optical axis, and a behavior of a light flux is controlled by optical actions to give a prescribed optical path difference for the light flux. Specifically, there are known various structures including a known diffractive structure. For example, there is a phase difference providing structure that generates a prescribed phase difference for adjoining ring-shaped zones. Further, a multi-level structure in a shape wherein a form of a staircase composed of several steps is repeated periodically is also an example of an optical path difference providing structure.

In another specific embodiment of the invention, the optical path difference structure includes any one of a diffractive structure, a phase difference providing structure and a multi-level structure.

In another specific embodiment of the invention, the microparticles to be dispersed in plastic resin are inorganic materials. In this case, even when the refractive index of plastic resin has a positive temperature coefficient, for example, the refractive index of the inorganic material usually shows a negative temperature coefficient, resulting in that the temperature coefficient of a light-transparent material, namely, of a lens can be changed variously in a range (including a negative case) that is equal to or lower than the original temperature coefficient of plastic resin.

In another specific embodiment of the invention, the inorganic material is an oxide. In this case, if the oxide is in the state of saturated oxidation, oxidation deterioration by a laser beam can be restrained. Further, even in the case where the light-transparent material is one formed by adding antioxidants into the plastic resin, oxidation deterioration by a laser beam can be lowered and restrained.

In another specific embodiment of the invention, there is provided a refracting interface which includes an aspheric surface. In this case, the light-converging for laser beam by the lens can be made to be more accurate.

Further, in the optical pickup device of the invention for converging a light flux emitted from a laser light source on an optical information recording medium by using a light-converging optical system, the optical information recording medium has a layer to generate near field light by a light-converging spot formed by the light-converging optical system, and at least one of optical elements included in the light-converging optical system is an optical element that is made of a material wherein microparticles each being equal to or smaller than a wavelength of a light flux emitted from the laser light source are dispersed in plastic resin.

In the optical pickup device, since at least one of optical elements included in the light-converging optical system is made of a material wherein microparticles each being equal to or smaller than a wavelength of a light flux emitted from the laser light source are dispersed in plastic resin, the temperature coefficient of the refractive index can be adjusted without lowering the transmittance of the material, by adjusting properly the state of microparticles in advance. It is therefore possible to make the image forming characteristic of the optical element to have the desired temperature characteristic, which makes it possible to control the fluctuations by the temperatures in a shape and a size of a beam of a light flux emitted from the laser light source. In other words, an accurate light-converged spot can be formed by the light-converging optical system, thus, near field light can be generated or detected accurately at necessary timing.

First Embodiment

FIG. 1 shows a semiconductor laser module in which the semiconductor laser light source device related to the First Embodiment is incorporated. Semiconductor laser oscillator 1 is inserted into the hollow portion at the rear end portion of cylinder-shaped lens holder 2 through its opening, and is fixed through welding and others. On the other hand, in front of light-emitting portion 11 of semiconductor laser oscillator 1, light-converging lens 3 is inserted into the hollow portion at the front end portion of the lens holder 2 through its opening, and is fixed on the inner circumferential surface 23 of the hollow portion by adhesives. On outer circumferential surface 22 of the lens holder 2, there is fitted connecting cylindrical portion 41 of connecting holder 4.

To this connecting holder 4, there is connected ferrule holder 5 that holds optical fiber 6 through ferrule 7. Due to this, end portion of incidence 60 of the optical fiber 6 is fixed on the semiconductor laser oscillator 1. Specifically, an end surface of flange 51 of the ferrule holder 5 is connected to front side end surface 42 of the connecting holder 4. Then, the end portion of incidence 60 of the optical fiber 6 is positioned and fixed, on a mounted on and dismounted from easily basis, by ferrule 7 for inserting the end portion of incidence 60 and the ferrule holder 5 for fixing ferrule. On one end of the hollow portion that is in parallel with the axis of the ferrule holder 5, there is formed stopper 53 that aligns point surface 73 of ferrule 7 for the optical fiber, and the end portion of incidence 60 of the optical fiber 6 is positioned by inserting ferrule 7 into the hollow portion of the ferrule holder 5. Owing to the existence of the stopper 53, aperture 61 can be arranged, corresponding to point surface 73 of ferrule 7, thus, an amount of light entering the end portion of incidence 60 of the optical fiber 6 can be controlled. Incidentally, in the foregoing, the connecting holder 4 and the ferrule holder 5 constitute a fixing means.

Semiconductor laser oscillator 1 is aligned by a step provided on one end of the lens holder 2, and is fixed. The semiconductor laser oscillator 1 houses therein a cooling device such as a Peltier element, and therefore, a wavelength of a laser beam emitted from the semiconductor laser oscillator 1 can be kept constant substantially, even ambient temperatures are changed. As the semiconductor laser oscillator 1, a long wavelength laser of InP-based material with a wavelength zone of 1.2-1.6 µm, for example, a semiconductor laser with a wavelength zone of 0.98 µm and a laser of GaAsAl-based material with a wavelength zone of 0.78 µm can be used.

As optical fiber 6, there is used an optical fiber having a core diameter of about 10-300 µm, for example, that is smaller than a light-emitting surface of the semiconductor laser oscillator 1, namely, a diameter of a laser beam in the case of emitting. Though this optical fiber 6 is a single-mode optical fiber in the present example, it is also possible to use a multi-mode optical fiber.

Light-converging lens 3 is a spherical lens or an aspheric lens which is made of plastics and has a pair of optical surfaces 32 and 32, and it is aligned by inner circumferential surface 23 and step 24 which are positioning members provided in lens holder 2, to be fixed. Though the light-converging lens 3 is a single lens in the present example, it is also possible to make it to be one wherein two or more lenses each having a different refractive index are combined. When manufacturing a semiconductor laser module, the connecting cylindrical portion 41 of the connecting holder 4 is moved back and forth for the lens holder 2 for fine adjustment, so that a laser beam that has been emitted from semiconductor laser oscillator 1 and has passed through the light-converging lens 3 may form an image accurately on the end portion of incidence 60 (core on an end surface) of the optical fiber 6 at a normal temperature.

The light-converging lens 3 is molded with materials which are transparent for the laser beam, capable of being used for lens molding and are adjustable in terms of temperature-affected characteristics which will be described in detail later.

In general, when microparticles are mixed with transparent resin materials, light scattering is caused and transmittance is lowered, which has made it difficult to use as an optical material. However, it has become clear that occurrence of scattering can be prevented substantially, by making microparticles to be smaller than a wavelength of transmitted light flux.

Incidentally, plastic resins generally have temperature-affected characteristics that the refractive index thereof is lowered if the temperature thereof rises. However, inorganic particles have temperature-affected characteristics that the refractive index thereof is raised if the temperature thereof rises. It is therefore known that these characteristics which are contrary to each other are made to operate to cancel each other so that no change of refractive index may be caused. Further, by adjusting properly temperature-affected characteristics of plastic resins for the refractive index and temperature-affected characteristics of inorganic particles for the refractive index, in terms of how they appear, it is possible to control freely a temperature coefficient in the case where the refractive index changes with a rise of a temperature, including a sign and an absolute value of the temperature coefficient. In the present embodiment, light-converging lens 3 representing an optical element is made of materials wherein inorganic particles each being in a size of not more than 30 nanometers, preferably in a size of not more than 20 nanometers, and more preferably in a size of not more than 10-15 nanometers, are dispersed. Due to this, light-converging lens 3 having the refractive index that has no temperature-dependency or has extremely low temperature-dependency can be provided. Or, light-converging lens 3 wherein the temperature-dependency for the refractive index is controlled at the option to a certain level can also be provided.

The addition amount of inorganic particles to a plastic material in this invention can be appropriately adjusted in view of required abilities and is not specifically limited. However, the addition amount of inorganic particles is preferably not less than 5 weight % and not more than 80 weight % based on the total weight.

In this invention, an optical element can be obtained by ejection molding of plastic resin, into which inorganic particles of a nanometer-level having been added, however, improvement of the ability (improvement of an athermal property) may not be achieved sufficiently when the addition amount of inorganic particles is less than the aforesaid range.

Further, on the contrary, an ejection molding property may become poor or the weight as an optical element may increase resulting in deterioration of the ability as a resin material (an ejection molding material) when the addition amount is over the aforesaid range. Further, there may be caused a problem of such as yellowing around the particles at the time of molding.

The inventors of this invention have been able to specify the aforesaid preferable range in view of such as a refractive index, a temperature dependence of the refractive index, properties of inorganic particles and a molding property of mixed resins, with respect to a variety of resins.

The effect of an athermal property differs depending on the value of dn/dt characteristic of inorganic particles, however, improving effect of an athermal property can be obtained by adding inorganic particles of not less than 5 weight %. In the case of utilizing inorganic particles such as PLZT and LiNbO$_3$, the addition of not less than 5 weight % can reduce dn/dt of the resin by approximately not less than 10%, which results in decreasing the necessity to correct aberration variations due to temperature changes. Therefore, freedom of an optical design can be increased.

On the other hand, increase of the specific gravity is depressed by making the addition amount of inorganic particles not more than 80 weight %. Particularly, in the case that an optical element is one of a type driven in an optical pick-up device, increase of electricity consumption by a driving member (an actuator) due to the weight increase can be depressed resulting in depressing generation of high temperature due to increased electricity consumption.

In an optical element of this invention, the sign of dn/dt of resin is possible to be reversed by adjusting the addition amount of inorganic particles. That is, it is possible to make the refractive index will increase according to the temperature of an optical element increases. For example, in the case of dispersing inorganic particles comprising LiNbO$_3$ in acrylic resin, it is possible to reverse the sign of dn/dt by setting the addition amount of the inorganic particles in acrylic resin to not less than 40 weight %. Since an optical element having such a constitution may provide excessive correction against temperature changes, refractive index changes may be compensated each other by being combined with another optical element comprising ordinary resin. In an optical system, by making a part of optical elements to exhibit excessive correction, refractive index changes due to temperature changes can be compensated as a total system even without making every optical elements athermal.

In the present example, the light-converging lens 3 is obtained by molding the materials wherein microparticles of niobium oxide (Nb$_2$O$_5$) are dispersed in acrylic resins. In the temperature-affected characteristics adjustable material of this kind, the volume ratio of the plastic that represents the basic material is about 80% and that of niobium oxide is about 20%, and these are mixed uniformly. Though microparticles have a problem that they tend to cohere, the necessary state of dispersion can be kept by a technology to disperse particles by giving electric charges to the surface of each particle. As described later, it is preferable that mixing and dispersing of resins and particles are conducted on an inline basis in the course of injection molding of an optical element. In other words, it is preferable that neither cooling nor solidification is conducted for the period from mixing and dispersing to the moment when the light converging lens 3 is molded.

Incidentally, for controlling a rate of change of the refractive index for temperature, a volume ratio of acrylic resins to niobium oxide in the aforementioned temperature-affected characteristics adjustable material can be raised or lowered properly, and it is also possible to blend and disperse plural types of inorganic particles in a nanometer size. Specifically, though a volume ratio of acrylic resins to niobium oxide is made to be 80:20, namely, to be 4:1, in the example stated above, it is possible to adjust properly within a range from 90:10 (9:1) to 40:60 (2:3). If an amount of niobium oxide is less to be out of 9:1, an effect of restraining temperature-affected changes becomes small, while, if an amount of niobium oxide is more to be out of 2:3, on the contrary, moldability of resins becomes problematic, which is not preferable.

Inorganic Particle:

It is preferable that microparticles are inorganic substances, and it is more preferable to be oxides. It is preferable that the state of oxidation is saturated, and the oxides are not oxidized any more.

Inorganic particles utilized in this invention have a mean particle diameter of not more than 30 nm and preferably not less than 1 nm. Since dispersion of particles is difficult when it is less than 1 nm, which may result in that desired abilities may not be obtained, while when the mean particle diameter is over 30 nm, the obtained thermoplastic material composition may become turbid to decrease transparency possibly resulting in a light transmittance of less than 70%. Herein, a mean particle diameter refers to a diameter of an equivalent volume sphere.

The shape of inorganic particles utilized in this invention is not specifically limited, but particles having a spherical shape are preferably utilized. Further, distribution of the particle diameter is not also specifically limited, but particles having a relatively narrow distribution rather than having a broad distribution are preferably utilized, with respect to exhibiting the effects of this invention more efficiently.

Inorganic particles utilized in this invention include, for example, inorganic oxide particles. More specifically, preferably listed are, for example, titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide, lead oxide; complex oxide compounds thereof such as lithium niobate, potassium niobate and lithium tantalate; and phosphate salts and sulfate salts comprising combinations with these oxides; and specifically preferably utilized are niobium oxide and lithium niobate.

Further, as inorganic particles of this invention, microparticles of a semiconductor crystal composition can also be preferably utilized. Said semiconductor crystal compositions are not specifically limited, but desirable are those generate no absorption, emission and phosphorescence in a wavelength range employed as an optical element. Specific composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) (SnO$_2$), tin sulfide (II, IV) (Sn(II)Sn(IV)S$_3$), tin sulfide (IV) (SnS$_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminu antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide (Al$_2$S$_3$), aluminum selenide. (Al$_2$Se$_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide (InSe) and indium telluride ($In_2Te_3$); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MoS_2$) and tungsten oxide (IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $Cu_{146}Se_{73}$(triethylphosphine)$_{22}$, described in Adv. Mater., vol. 4, p.494 (1991) by G. Schmid, et al., are also listed as examples.

These micro-particles may be utilized alone or in combination of plural types.

Manufacturing Method of Inorganic Particles and Surface Modification:

A manufacturing method of inorganic particles of this invention is not specifically limited and any commonly known method can be employed. For example, desired oxide particles can be obtained by utilizing metal halogenides or alkoxy metals as starting materials which are hydrolyzed in a reaction system containing water. At this time, also employed is a method in which such as an organic acid or an organic amine is simultaneously utilized to stabilize the particles. More specifically, for example, in the case of titanium dioxide particles, employed can be a well known method described in Journal of Physical Chemistry vol. 100, pp. 468-471 (1996). According to these methods, for example, titanium dioxide having a mean particle diameter of 5 nm can be easily manufactured by utilizing titanium tetraisopropoxide or titanium tetrachloride as a starting material in the presence of an appropriate additive when being hydrolyzed in an appropriate solvent. Further, inorganic particles of this invention are preferably modified on their surface. A method to modify the particle surface is not specifically limited and any commonly known method can be employed. For example, there is a method in which the particle surface is modified by hydrolysis in the presence of water. In this method, catalysts such as acid and alkali are suitably utilized, and it is generally considered that hydroxyl groups on the particle surface and hydroxyl groups having been generated by hydrolysis of a surface modifying agent form bonds by dehydration. Surface modifying agents preferably utilized in this invention include, for example, tetramethoxysilane, tetraehtoxysilane, tetraisopropoxysilane, tetraphenoxysilane, methyltrimethoxysilane, ethyltrimethoxysilane, propyltrimethoxysilane, methyltriethoxysilane, methyltriphenoxysilane, ethyltriethoxysilane, phenyltrimethoxysilane, 3-methylphenyltrimethoxysilane, dimethyldimethoxysilane, diethyldiethoxysilane, diphenyldimethoxysilane, diphenyldiphenoxysilane, trimethylmethoxysilane, triethylethoxysilane, triphenymethoxysilane and triphenylphenoxysilane. These compounds have different characteristics such as a reaction speed, and utilized may be a compound suitable for the conditions of surface modification. Further, one type may be utilized or plural types may be utilized in combination. Since the properties of obtained inorganic particles may differ depending on the utilized compound, affinity for the thermoplastic resin utilized to prepare a material composition can be promoted by selecting the compound being employed for the surface modification. The degree of surface modification is not specifically limited, and preferably 10-99 weight % and more preferably 30-98 weight % based on micro-particles after surface modification.

Being an inorganic substance is preferable, because a reaction on plastic resins representing high molecular organic compounds can be restrained to be low, and being oxides can prevent deterioration caused by use. Especially, under the severe conditions such as high temperatures and exposure to laser beam, oxidation tends to be accelerated. However, deterioration caused by oxidation can be prevented in microparticles of inorganic oxides. It is naturally possible to add antioxidant to prevent oxidation of resins caused by the other reasons.

Plastic Resin:

Plastic resin utilized in an optical element of this invention is transparent plastic resin commonly utilized. For example, resins described in Japanese Patent Application Nos. 2002-308933, 2002-309040 and 2002-308964 can be appropriately employed. Specifically, listed are acrylic resin, cyclic olefin resin, polycarbonate resin, polyester resin, polyether resin, polyamide resin and polyimide resin.

As plastic resin utilized in an optical element of this invention, specifically preferably utilized is polymers provided with an alicyclic structure.

In particular, listed is acrylic resin, polycarbonate resin provided with an alicyclic chain, polyester resin provided with an alicyclic chain, polyether resin provided with an alicyclic chain, polyamide resin provided with an alicyclic chain or polyimide resin provided with an alicyclic chain. More specifically, for example, listed are resins provided with a structural skeleton represented by chemical structures (1)-(14) described in following Table 1, however this invention is not limited thereto.

TABLE 1

| Chemical structure | Structure | Refractive index n | Abbe's number ν |
|---|---|---|---|
| (1) | —(CH₂—C(CH₃)(C(=O)—O—CH₃))— | 1.49 | 58 |
| (2) | bicyclic –CH₂—CH₂– repeat unit | 1.54 | 56 |
| (3) | bis(cyclohexyl) carbonate repeat unit | 1.53 | 57 |
| (4) | bis(cyclohexyl)-C(CH₃)₂- carbonate repeat unit | 1.51 | 58 |
| (5) | cyclohexyl carbonate repeat unit | 1.52 | 57 |
| (6) | bis(cyclohexyl)-O-C(=O)-cyclohexyl-C(=O)-O repeat unit | 1.54 | 55 |
| (7) | bis(cyclohexyl)-C(CH₃)₂-cyclohexyl-O-C(=O)-cyclohexyl-C(=O)-O repeat unit | 1.53 | 57 |
| (8) | bis(cyclohexyl)-O- repeat unit | 1.55 | 57 |
| (9) | bis(cyclohexyl)-C(CH₃)₂-O- repeat unit | 1.54 | 57 |
| (10) | cyclohexyl-O- repeat unit | 1.55 | 58 |

TABLE 1-continued

| Chemical structure | Structure | Refractive index n | Abbe's number ν |
|---|---|---|---|
| (11) | 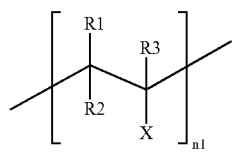 | 1.55 | 53 |
| (12) | | 1.54 | 55 |
| (13) | | 1.54 | 56 |
| (14) | | 1.58 | 43 |

Polymers provided with an alicyclic structure are more preferably alicyclic hydrocarbon type copolymers which contain repeating unit (a) provided with an alicyclic structure represented by following general formula (1) and repeating unit (b) comprising a chain structure represented by following general formula (2) and/or (3) so as to make the sum content of not less than 90 weight %, and, further, make the content of repeating unit (b) not less than 1 weight % and less than 10 weight %.

General formula (1)

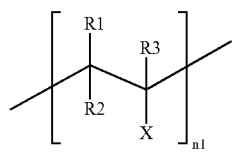

General formula (2)

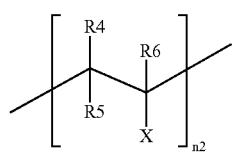

General formula (3)

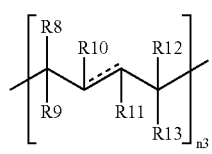

In formula (1), X represents an alicyclic hydrocarbon group, R1-R13 in general formula (1), (2) and (3) each independently represent a hydrogen atom, a chain hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property. Halogen atoms include a fluorine atom, a chlorine atom, a bromine atom and an iodine atom. Chain hydrocarbon groups substituted by a polar group include, for example, a halogenated alkyl group having a carbon number of 1-20, preferably of 1-10 and more preferably of 1-6. Chain hydrocarbon groups include, for example, an alkyl group having a carbon number of 1-20, preferably of 1-10 and more preferably of 1-6; and alkenyl group having a carbon number of 2-20, preferably of 2-10 and more preferably of 2-6.

X in general formula (1) represents an alicyclic hydrocarbon group, and the carbon number constituting which is generally 4-20, preferably 4-10 and more preferably 5-7. By setting the carbon number constituting an alicyclic structure into this range, double refraction can be reduced. Further, an alicyclic structure may include not only a monocyclic structure but also polycyclic structures such as a norbornane ring and a dicyclohexane ring.

The alicyclic hydrocarbon group may be provided with a carbon-carbon unsaturated bond, however, the content is not more than 10%, preferably not more than 5% and more preferably not more than 3%, based on the total carbon-carbon bonds. By setting the content of carbon-carbon unsaturated bonds of an alicyclic hydrocarbon group into this range, transparency and heat resistance are improved. Further, to carbon atoms constituting an alicyclic hydrocarbon group, bonded may be such as a hydrogen atom, a hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property.

Further, . . . in general formula (3) represents a carbon-carbon saturated bond or a carbon-carbon unsaturated bond, and the content of an unsaturated bond is generally not more than 10%, preferably not more than 5% and more preferably not more than 3%, based on the total carbon-carbon bonds constituting the main chain, when transparency and heat resistance are strongly required.

Among repeating units represented by general formula (1), the repeating units represented by general formula (4) is excellent with respect to heat resistance and a low water absorbing property.

General formula (4)

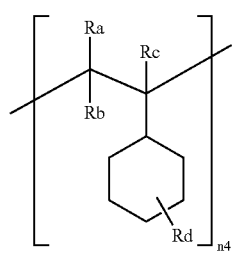

Among repeating units represented by general formula (2), the repeating units represented by general formula (5) is excellent with respect to heat resistance and a low water absorbing property.

General formula (5)

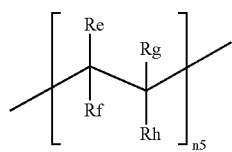

Among repeating units represented by general formula (3), the repeating units represented by general formula (6) is excellent with respect to heat resistance and a low water absorbing property.

General formula (6)

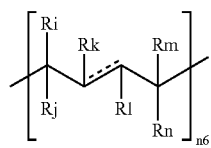

Ra, Rb, Rc, Rd, Re, Rf, Rg, Rh, Ri, Rj, Rk, Rl, Rm and Rn in general formula (4), (5) and (6) each independently represent a hydrogen atom or a lower chain hydrocarbon group, and hydrogen atom or a lower alkyl group having a carbon number of 1-6 is preferred due to excellent with respect to heat resistance and low water absorbability.

Among repeating units of a chain structure represented by general formula (2) and (3), the repeating units of a chain structure represented by general formula (3) exhibits a more excellent strength property of obtained hydrocarbon type polymer.

In this invention, the sum content of repeating unit (a) provided with an alicyclic structure represented by general formula (1) and repeating unit (b) provided with a chain structure represented by general formula (2) and/or general formula (3), in hydrocarbon copolymer, is generally not less than 90%, preferably not less than 95% and more preferably not less than 97%, based on weight. By setting the sum content into the aforesaid range, low double refraction, heat resistance, low water absorbability and mechanical strength are highly suitably balanced.

The content of repeating unit (b) provided with a chain structure in an alicyclic hydrocarbon type copolymer is appropriately selected depending on the objective of application, however, is generally in a range of 1-10%, preferably of 1-8% and more preferably of 2-6%, based on weight. When the content of repeating unit (b) is in the aforesaid range, low double refraction, heat resistance and low water absorbability are highly suitably balanced.

Further, a chain length of repeating unit (a) is sufficiently short compared to a molecular chain length of an alicyclic hydrocarbon type copolymer, and specifically A is in a range of not more than 30% of B, preferably not more than 20%, more preferably not more than 15% and most preferably not more than 10%, when A=(a weight average molecular weight of a repeating unit chain provided with an alicyclic structure) and B=(a weight average molecular weight of an alicyclic hydrocarbon type copolymer (Mw)×(a number of repeating units provided with an alicyclic structure/a number of the whole repeating unit constituting an alicyclic hydrocarbon type copolymer)). Low double refraction is inferior when A is out of this range.

Further, a chain length of repeating unit (a) preferably has a specific distribution. Specifically, A/C is preferably in a range of not less than 1.3, more preferably 1.3-8 and most preferably 1.7-6, when A=(a weight average molecular weight of a repeating unit chain provided with an alicyclic structure) and C=(a number average molecular weight of a repeating unit chain provided with an alicyclic structure). A blocking degree increases when A/C is excessively small while a random degree increases when A/C is excessively large and low double refraction is inferior in the both cases.

The molecular weight of an alicyclic hydrocarbon type copolymer is in a range of 1,000-1,000,000, preferably 5,000-500,000, more preferably 10,000-300,000 and most preferably 50,000-250,000 as a polystyrene (or polyisoprene) equivalent weight average molecular weight which is measured by means of gel permeation chromatography (hereinafter, referred to as GPC). A strength property of the molded material is inferior when the weight average molecular weight of an alicyclic hydrocarbon type copolymer is excessively small, while the double refraction of the molded material become large when it is excessively too large.

The molecular weight distribution of such copolymers can be appropriately selected depending on the objective of the application, however, it is generally in a range of not more than 2.5, preferably not more than 2.3 and more preferably not more than 2, as a ratio (Mw/Mn) of a polystyrene (or polyisoprene) equivalent weight average molecular weight which is measured by means of GPC (Mw) to a number average molecular weight (Mn). Mechanical strength and heat resistance can be highly suitably balanced when Mw/Mn is in this range.

The glass transition temperature (Tg) of the copolymer may be suitably selected depending on the objective of the application, however, is generally 50-250° C., preferably 70-200° C. and more preferably 90-180° C.

Manufacturing Method of Alicyclic Hydrocarbon Type Copolymer

Manufacturing method of alicyclic hydrocarbon type copolymer of this invention includes (1) a method in which aromatic vinyl type compound and another copolymerizable monomer are copolymerized and carbon-carbon unsaturated bonds of the main chain and of aromatic ring are hydrogenated; and (2) a method in which alicyclic vinyl type compound and another copolymerizable monomer are copolymerized and the resulting product is appropriately hydrogenated.

In the case of manufacturing an alicyclic hydrocarbon type copolymer of this invention according to the aforesaid method, it can be efficiently prepared by hydrogenating carbon-carbon unsaturated bonds in the main chain and unsaturated rings such as an aromatic or a cycloalkene ring of a copolymer, which is a copolymer of an aromatic vinyl type compound and/or an alicyclic vinyl type compound (a') and copolymerizable another monomer (b') and a repeating unit arising from compound (a') in the copolymer is provided with a chain structure in which D is not more than 30% of E, preferably not more than 20%, more preferably not more than 15% and most preferably not more than 10%, when D=(the weight average molecular weight of a repeating unit chain arising from an aromatic vinyl type compound and/or an alicyclic vinyl type compound) and E=(the weight average molecular weight of hydrocarbon type copolymer (Mw)×(the number of a repeating unit chain arising from an aromatic vinyl type compound and/or an alicyclic vinyl type compound/the total number of repeating unit constituting a hydrocarbon type copolymer)). The low double refraction property of the obtained alicyclic hydrocarbon type copolymer is inferior when D is out of the aforesaid range.

In this invention, method (1) is preferred to prepare an alicyclic hydrocarbon type copolymer more efficiently.

Copolymers before the above-described hydrogenation is further preferably have D/F in a definite range when F=(a number average molecular weight of a repeating unit chain arising from an aromatic vinyl type compound and/or an alicyclic vinyl type compound). Specifically, D/F is preferably in a range of not less than 1.3, more preferably 1.3-8 and most preferably 1.7-6. The low double refraction property of the obtained alicyclic hydrocarbon type copolymer is inferior when D/F is out of this range.

The weight average molecular weight and number average molecular weight of a repeating unit arising from the aforesaid compound (a') can be determined, for example, by a method, described in Macromolecules, vol. 16, pp. 1925-1928 (1983), in which unsaturated double bonds in an aromatic vinyl type copolymer are reductive cleaved after having been subjected to ozone addition and the molecular weight of obtained aromatic vinyl chain is measured.

The molecular weight of a copolymer before hydrogenation is in a range of 1,000-1,000,000, preferably 5,000-500,000 and more preferably 10,000-300,000, as a polystyrene (or polyisoprene) equivalent weight average molecular weight which is measured by means of GCP. A strength property of the obtained alicyclic hydrocarbon type copolymer is inferior when the weight average molecular weight (Mw) of the copolymer is excessively small, while the hydrogenation reactivity is inferior when it is excessively large.

Specific examples of aromatic vinyl type compounds utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene, and such as styrene, 2-methylstyrene, 3-methylstyrene and 4-methylstyrene are preferable.

Specific examples of alicyclic vinyl type compounds utilized in above-described method (2) include, for example, cyclobutylethylene, cyclopentylethylene, cyclohexylethylene, dicycloheptylethylene, cyclooctylethylene, nolbonylethylene, dicyclohexylethylene, α-methylcyclohexylethylene, α-t-butylcyclohexylethylene, cyclopentenylethylene, cyclohexenylethylene, cyclobutenylethylene, cyclooctenylethylene, cyclodecenylethylene, nolbonenylethylene, α-methylcyclohexenylethylene and α-t-butylcyclohexenylethylene, and cyclohexylethylene and α-methylcyclohexylethylene are preferable among them.

These aromatic vinyl type compounds and alicyclic vinyl type compounds can be utilized alone or in combination of two or more types.

Copolymerizable another monomers are not specifically limited, and utilized are such as chain vinyl compounds and chain conjugated diene compounds. In the case of utilizing chain conjugated diene compounds, the operating properties in the manufacturing process is superior, as well as the strength property of obtained alicyclic hydrocarbon type copolymer is excellent.

Specific examples of chain vinyl compounds include, for example, chain olefin monomers such as ethylene, propylene, 1-butene, 1-pentene and 4-methyl-1-pentene; nitrile type monomers such as 1-cyanoethylene (acrylonitrile), 1-cyano-1-methylethylene (methacrylonitrile) and 1-cyano-1-chloroethylene α-chloroacrylonitrile), (meth)acrylic acid ester type monomers such as 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonylethylene (acrylic acid methyl ester), 1-ethoxycarbonylethylene (acrylic acid ethyl ester), 1-propoxycarbonylethylene (acrylic acid propyl ester) and 1-butoxycarbonylethylene (acrylic acid butyl ester); unsaturated fatty acid type monomers such as 1-carboxyethylene (acrylic acid), 1-carboxy-1-methylethylene (methacrylic acid) and maleic anhydride, preferable are chain olefin monomers and most preferable are ethylene, propylene and 1-butene.

Conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable are chain conjugated dienes and specifically preferable are butadiene and isoprene. These chain vinyl compounds and chain conjugated dienes each can be utilized alone or in combination of two or more types.

A method to polymerize compounds (a') is not specifically limited and includes such as a one-step polymerization method (a batch method) and a monomer successive addition method (a method in which, after starting polymerization by using a part of the whole using amount of the monomer, polymerization is proceeded by successively adding the residual monomer). In particular, a hydrocarbon type copolymer provided with a preferable chain structure can be prepared by employing a monomer successive addition method. A copolymer before hydrogenation has the more random structure, the smaller is the aforesaid D, and/or the larger is the D/F. How much degree of random structure a copolymer has, is determined by a rate ratio of a polymerization rate of aromatic vinyl compound to that of copolymerizable another monomer, and the smaller is this rate ratio, the chain structure of more random structure has the copolymer.

According to the aforesaid monomer successive addition method, since uniformly mixed monomers are successively added into the polymerization system, it is possible to more decrease the polymerization selectivity of monomer in a polymer growth process by polymerization, different from a batch method, resulting in more random chain structure of the obtained copolymer. Further, the polymerization temperature can be stably maintained low because accumulation of polymerization reaction heat in the polymerization system is small.

In the case of a monomer successive addition method, polymerization is started by addition of an initiator in the state that generally 0.01-60 weight %, preferably 0.02-20 weight % and more preferably 0.05-10 weight % among the total using amount of the monomer presents as an initial monomer in a polymerization reaction vessel in advance. By setting the amount of the initial monomer in such a range, easily removed can be reaction heat generated in the initial reaction after starting polymerization resulting in preparation of a copolymer having a more random chain structure.

By continuing the reaction until a polymerization conversion ratio of the aforesaid monomer reaches to not less than 70%, preferably not less than 80% and more preferably not less than 90%, preparation of a copolymer having a more random chain structure results. Thereafter, the residual portion of the aforesaid monomer is discontinuously added to the reaction system, and the addition rate is determined in view of consumption rate of the monomer in the polymerization system.

The addition of the residual monomer is adjusted to finish in a range of 0.5-3 times, preferably 0.8-2 times and more preferably 1-1.5 times, of a time duration given by a relation $[(100-I) \times T/I]$, when a required time until the polymerization conversion ratio of the initial monomer reaches to 90% is T, and the ratio (%) of the initial monomer to the total monomer utilized is I. Specifically, the addition rates of the initial monomer and of the residual monomer are determined so that the addition time duration of the residual monomer is in a range of generally 0.1-30 hours, preferably 0.5-5 hours and more preferably 1-3 hours. Further, a polymerization conversion ratio of the total monomer immediately after the finish of the monomer addition is generally not less than 80%, preferably not less than 85% and more preferably not less than 90%. By setting a polymerization conversion ratio of the total monomer immediately after the finish of the monomer addition to the aforesaid range, obtained copolymer have a more random chain structure.

The polymerization method includes such as radical polymerization, anion polymerization and cation polymerization, and is not specifically limited. However, anion polymerization is preferred in view of polymerization operation, easiness of a hydrogenation reaction in the post process and mechanical strength of a finally obtained hydrocarbon type copolymer.

In the case of radical polymerization, block polymerization, solution polymerization, suspension polymerization and emulsion polymerization in the presence of an initiator, in a temperature range of generally 0-200° C. and preferably 20-150° C. can be employed, and in particular, in the case of prevention of impurity mixing in resin is required, block polymerization and suspension polymerization are preferred. As a radical initiator, utilized can be organic peroxides such as benzoyl peroxide, lauroyl peroxide and t-butylperoxy-2-ethylhexaate, azo compounds such as azobisbutyronitrile, 4,4-azobis-4-cyanopenoic acid and azodibenzoyl, water-soluble catalysts exemplified by potassium persulfate and ammonium persulfate and redox initiators.

In the case of anion polymerization, block polymerization, solution polymerization and slurry polymerization in the presence of an initiator, in a temperature range of generally 0-200° C., preferably 20-100° C. preferably and specifically preferably 20-80° C. can be employed, however, solution polymerization is preferred in view of removal of reaction heat. In this case, an inert solvent which can dissolve the polymer and the hydrogenation product thereof is utilized. Inert solvents utilized in solution reaction include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized alone or in combination of two or more types, and are utilized at a ratio of 200-10,000 weight parts against 100 weight parts of the total using monomers.

As an initiator for the anion polymerization described above, usable are, for example, mono organolithium compounds such as n-butyl lithium, sec-butyl lithium, t-butyl lithium, hexyl lithium and phenyl lithum; and multi-functional organolithium compounds of such as dilithiomethane, 1,4-dilithiobutane and 1,4-dilithio-2-ethylcyclohexane.

In polymerization reaction, a polymerization accelerator and a randomizer (an additive to prevent a chain of certain one component from becoming long) can also be utilized. In the case of anion polymerization, for example, a Lewis base compound can be utilized as a randomizer. Specific examples of a Lewis base compound include, for example, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

Polymers obtained according to the above radical polymerization or anion polymerization can be recovered by means of commonly known methods such as a steam stripping method, a direct desolvation method and an alcohol coagulation method. Further, at the time of polymerization, in the case of utilizing an inert solvent in hydrogenation reaction, the polymer is not recovered from polymerization solution but can be supplied into hydrogenation process as it is.

Hydrogenation Method of Unsaturated Bond:

In the case of performing hydrogenation of carbon-carbon double bonds in an unsaturated ring such as an aromatic ring and a cycloalkene ring or unsaturated bonds in a main chain of in copolymers before hydrogenation, the reaction method and reaction form are not specifically limited, and can be performed according to commonly known method. However, preferred is a hydrogenation method which can increase a hydrogenation degree as well as decrease a polymer chain cleaving reaction caused simultaneously with the hydrogenation, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminums such as diethylaluminum chloride and ethylaluminum dichloride; and alkylaluminum hydrides such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenated catalysts can be utilized each alone or in combination of two or more types, and the using amount is generally 0.01-100 parts preferably 0.05-50 parts and more preferably 0.1-30 parts, based on weight against the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneous with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation rate of thus obtained hydrogenated compounds is generally not less than 90%, preferably not less than 95% and more preferably not less than 97%, based on 1H-NMR measurement, with respect to any of carbon-carbon unsaturated bonds of a main chain, carbon-carbon double bonds of an aromatic ring and carbon-carbon double bonds of an unsaturated ring. Such as a low double refraction property and thermal stability are deteriorated when the hydrogenation rate is low.

A method to recover a hydrogenated compound after finishing the hydrogenation reaction is not specifically limited. Generally, utilized can be a method in which the solvent is removed from the hydrogenated compound solution by means of direct drying after elimination of the residue of a hydrogenation catalyst by means of such as filtration and centrifugal separation, and a method in which the hydrogenated compound solution is poured into a poor solvent for the hydrogenated compound to coagulate the hydrogenated compound.

Polymers provided with an alicyclic structure is further preferably block copolymers provided with polyomer block [A] and polyomer block [B]. Polymer block [A] contains repeating unit [1] represented by following formula (1). The content of repeating unit [1] in polymer block [A] is preferably not less than 50 mol %, more preferably not less than 70 mol % and most preferably not less than 90 mol %.

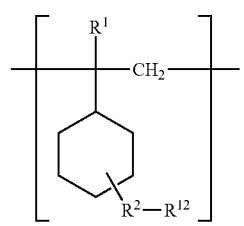

Formula (1)

(in the formula, $R^1$ represents a hydrogen atom or an alkyl group having a carbon number of 1-20, $R^2$-$R^{12}$ each independently represent a hydrogen atom, an alkyl group having a carbon number of 1-20, a hydroxyl group, an alkoxy group having a carbon number of 1-20 or a halogen group. Herein, the aforesaid $R^2$-$R^{12}$ are $R^2$, $R^3$, $R^4$, $R^5$, $R^6$, $R^7$, $R^8$, $R^9$, $R^{10}$, $R^{11}$ and $R^{12}$. Hereinafter, it is similar.)

A preferable structure of repeating unit [1] represented by above formula (1) is one in which $R^1$ is a hydrogen atom or a methyl group and all of $R^2$-$R^{12}$ are hydrogen atoms. The transparency and mechanical strength are superior when the content of repeating unit [1] in polymer block [A] is in the above range. In polymer block [A], the residual parts except aforesaid repeating unit [1] are repeating units arising from chain conjugated dienes or chain vinyl compounds which have been hydrogenated.

Polymer block [B] contains aforesaid repeating unit [1] and repeating unit [2] represented by following formula (2) and/or [3] represented by following formula (3). The content of repeating unit [1] in polymer block [B] is preferably 40-95 mol % and more preferably 50-90 mol %. The transparency and mechanical strength are superior when the content of repeating unit [1] is in the above range. When a mol fraction of repeating unit [2] in polymer block [B] is m2 (mol %) and a mol fraction of repeating unit [3] is m3 (mol %), 2×m3+m2 is preferably not less than 2 mol %, more preferably 5-60 mol % and most preferably 10-50 mol %.

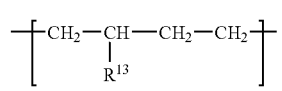

Formula (2)

(in the formula, $R^{13}$ represents a hydrogen atom or an alkyl group having a carbon number of 1-20.)

A preferable structure of repeating unit [2] represented by above formula (2) is one in which $R^{13}$ is a hydrogen atom or a methyl group.

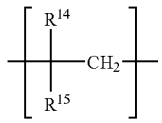

Formula (3)

(in the formula, $R^{14}$ and $R^{15}$ each independently represent a hydrogen atom or an alkyl group having a carbon number of 1-20.)

A preferable structure of repeating unit [3] represented by above formula (3) is one in which $R^{14}$ is a hydrogen atom and $R^{15}$ is a methyl group or an ethyl group.

The mechanical strength is decreased when the content of aforesaid repeating unit [2] or repeating unit [3] in polymer block [B] is excessively small. Therefore, transparency and mechanical strength are superior when the content of repeating unit [2] and repeating unit [3] is in the above range. Polymer block [B] may contain repeating unit [X] represented by following formula (X). The content of repeating unit [X] is in a range not to damage the characteristics of a block copolymer of this invention, and is preferably not more than 30 mol % and more preferably not more than 20 mol %, based on the total block copolymer.

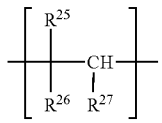

Formula (X)

(in the formula, $R^{25}$ represents a hydrogen atom or an alkyl group having a carbon number of 1-20, $R^{26}$ represents a nitrile group, an alkoxycarbonyl group, a formyl group, a hydroxycarbonyl group or a halogen group, and $R^{27}$ represents a hydrogen atom. $R^{25}$ and $R^{27}$ may represent an acid anhydride group or an imido group by bonding to each other.)

Further, polymer block [B] utilized in this invention preferably satisfy the relationship of a>b, when the mol fraction of repeating unit [1] in polymer block [A] is a, and the mol fraction of repeating unit [1] in polymer block [B] is b. Thereby, transparency and mechanical strength are superior.

Further, with respect to block copolymer utilized in this invention, the ratio ma/mb is preferably 5/95-95/5, more preferably 30/70-70/30 and most preferably 40/60-60/40, when a mol number of total repeating units constituting block [A] is ma and a mole number of total repeating units constituting block [B] is mb. Mechanical strength and heat resistance are superior when ma/mb is in the above range.

The molecular weight of an block copolymer utilized in this invention is preferably in a range of 10,000-300,000, more preferably 15,000-250,000 and most preferably 20,000-200,000 as a polystyrene (or polyisoprene) equivalent weight average molecular weight (hereinafter, described as Mw) which is measured by means of gel permeation chromatography employing tetrahydrofuran (THF) as a solvent. The balance of mechanical strength, heat resistance and a molding property is superior when Mw of a block copolymer is in the above range.

The molecular weight distribution of a block copolymer can be appropriately selected depending on the objective of the application, however, it is preferably not more than 5, more preferably not more than 4 and most preferably not more than 3, as a ratio (Mw/Mn) of a polystyrene (or polyisoprene) equivalent weight average molecular weight which is measured by means of GCP (hereinafter referred to as Mw) to a number average molecular weight (Mn). Mechanical strength and heat resistance are superior when Mw/Mn is in this range.

The glass transition temperature (Tg) of the copolymer may be suitably selected depending on the objective of the application, however, is preferably 70-200° C., more preferably 80-180° C. and most preferably 90-160° C., as a high temperature side value measured by a differential scanning type thermal analyzer (hereinafter, described as DSC).

The above-described block copolymer utilized in this invention is provided with polymer block [A] and polymer block [B], and may be any of a di-block copolymer of ([A]-[B]) form, a tri-block copolymer of ([A]-[B]-[A]) or ([B]-[A]-[B]) and a block copolymer in which at least 4 blocks of polymer block [A] and polymer block [B] are bonded alternately. Further, it may be a block copolymer in which these blocks are bonded in a radial form.

Block copolymers utilized in this invention can be obtained by the following methods. Listed is a method in which a polymer block having a repeating unit arising from an aromatic vinyl compound and/or an alicyclic vinyl compound, and a polymer block having a repeating unit arising from a vinyl type monomer are prepared by polymerizing a mixture of a monomer mixture containing an aromatic vinyl compound and/or an alicyclic vinyl compound, and a monomer mixture containing a vinyl type monomer (except aromatic vinyl compounds and alicyclic vinyl compounds), followed by hydrogenation of aromatic rings and/or aliphatic rings in said block copolymers. Further, listed is a method in which a monomer mixture containing a saturated alicyclic vinyl compound and a vinyl type monomer (except aromatic vinyl compounds and alicyclic vinyl compounds) are polymerized to prepare block copolymer having a repeating unit arising from an alicyclic vinyl compound and a repeating unit arising from a vinyl type compound. Among them, more preferable to obtain a block copolymer of this invention is, for example, the following method.

(1) In the first method, first, polymer block [A'] containing a repeating unit arising from an aromatic vinyl compound and/or an alicyclic vinyl compound which has unsaturated bonds in the ring is prepared by polymerizing a monomer mixture [a'] containing not less than 50 mol % of an aromatic vinyl compound and/or an alicyclic vinyl compound which has unsaturated bonds in the ring. Polymer block [B'] is prepared by polymerizing a monomer mixture [b'] which contains not less than 2 mol % of a vinyl type monomer (except aromatic vinyl compounds and alicyclic vinyl compounds), and containing an aromatic vinyl compound and/or an alicyclic vinyl compound which has unsaturated bonds in the ring at a ratio less than that in monomer mixture [a']. After preparing a block copolymer provided with aforesaid polymer block [A'] and polymer block [B'] via at least these process, aromatic rings and/or alicyclic rings in said block copolymer are hydrogenated.

(2) In the second method, first, polymer block [A] containing a repeating unit arising from an saturated alicyclic vinyl compound by polymerizing a monomer mixture containing not less than 50 mol % of an saturated alicyclic vinyl compound. Polymer block [B] containing a repeating unit arising from a saturated alicyclic vinyl compound and a repeating unit arising from a vinyl monomer is prepared by polymerizing a monomer mixture [b] which contains not less than 2 mol % of a vinyl type monomer (except aromatic vinyl compounds and alicyclic vinyl compounds), and containing a saturated alicyclic vinyl at a ratio less than that in monomer mixture [a]. A block copolymer provided with aforesaid polymer block [A] and polymer block [B] via at least these process.

Among the above methods, above-described method (1) is more preferred, with respect to easy availability of monomers, polymerization yield, easiness of introducing a repeating unit [1] into polymer block [B'].

Specific examples of aromatic vinyl compounds in above method (1) include such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 4-t-butylstyrene, 5-t-butyl-2-methylstyrene, monochlorostyrene, dichlorostyrene, monofluorostyrene and 4-phenylstyrene, as well as those having substituents such as a hydroxyl group and an alkoxy group therein. Among them, preferable are such as 2-methylstyrene, 3-methylstyrene and 4-methylstyrene.

Specific examples of unsaturated alicyclic vinyl compounds in above method (1) include such as cyclohexenyl ethylene, α-methylcyclohexenyl ethylene and α-t-butylcyclohexenyl ethylene, as well as those having substituents such as a halogen group, an alkoxy group or a hydroxyl group therein.

These aromatic vinyl compounds and alicyclic vinyl compounds can be utilized each alone or in combination of two or more types. However, it is more preferable, in this invention, to utilize an aromatic vinyl compound in either of monomer mixtures of [a'] and [b'], and, in particular, more preferable to utilize α-methylstyrene.

Vinyl monomers utilized in the above method include chain vinyl compounds and chain conjugated diene compounds.

Specific examples of chain vinyl compounds include chain olefin monomers such as ethylene, propylene, 1-butene, 1-pentene and 4-mthyl-1-pentene, and, among them, most preferable are ethylene, propylene and 1-butene.

Chain conjugated diene compounds include, for example, 1,3-butadiene, isoprene, 2,3-dimethyl-1,3-butadiene, 1,3-pentadiene and 1,3-hexadiene. Chain conjugated dienes, among these chain vinyl compounds and chain conjugated dienes, are preferred, and butadiene and isoprene are most preferred. These chain vinyl compounds and chain conjugated dienes can be utilized each alone or in combination of two or more types.

In the case of utilizing a monomer mixture containing the above-described monomers, a polymerization reaction may be performed by means of any polymerization method such as radial polymerization, anion polymerization or cation polymerization, and preferably by means of anion polymerization and most preferably by means of living anion polymerization in the presence of an inert solvent.

Anion polymerization is performed in the presence of a polymerization initiator in a temperature range of generally 0-200° C., preferably 20-100° C. and most preferably 20-80° C. As initiators, utilized can be, for example, mono-organolithium compounds such as n-butyl lithium, sec-butyl lithium, t-butyl lithium, hexyl lithium and phenyl lithium; and multifunctional organolithium compounds such as dilithiomethane, 1,4-dilithiobutane and 1,4-dilithio-2-ethylcyclohexane.

Inert solvents utilized include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized each alone or in combination of two or more types, and are utilized at a ratio of 200-10,000 weight parts against 100 weight parts of the total using monomers.

At the time of polymerizing each polymer block, a polymerization accelerator or a randomizer can be utilized to prevent a certain one component chain from growing long. In particular, in the case of performing a polymerization reaction by means of anion polymerization, such as a Lewis base compound can be utilized as a randomizer. Specific examples of a Lewis base compound include, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

A method to preparation a block copolymer by means of living anion polymerization includes commonly known methods such as a consecutive addition polymerization reaction method and a coupling method, and in this invention, a consecutive addition polymerization reaction method is preferably employed.

In the case of preparing the above block copolymer provided with polymer block [A'] and polymer block [B'] by means of a consecutive addition polymerization method, a process to obtain polymer block [A'] and a process to obtain polymer block [B'] are performed successively in order. Specifically, in an inert solvent, polymer block [A'] is prepared by polymerizing monomer mixture [a'] in the presence of the above-described living anion polymerization catalyst, and polymer block [B'] connected to polymer block [A'] is prepared by continuing polymerization by successively adding monomer mixture [b'] into the reaction system. Further, if desired, monomer mixture [a'] is added to perform polymerization resulting in preparation of a tri-block substance by connecting polymer block [A'], then monomer mixture [b'] is further added to perform polymerize resulting in preparation of a tetra-block substance.

The obtained block copolymer is recovered by means of commonly known methods such as a steam stripping method, a direct desolvation method and an alcohol coagulation method. Further, at the time of polymerization, in the case of utilizing an inert solvent in a hydrogenation reaction, it is not necessary to recover the polymer from polymerization solution because the polymerization solution can be utilized in the hydrogenation process as it is.

Block copolymers provided with polymer block [A] and polymer block [B'], which is prepared by aforesaid method (1), are preferably those having a repeating unit of the following structure.

Preferable polymer block [A'] constituting block copolymer of before hydrogenation is a polymer block containing not less than 50% of repeating unit [4] represented by the following formula (4).

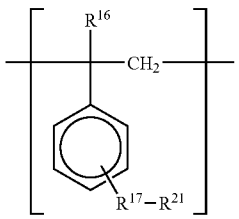

Formula (4)

(in the formula, $R^{16}$ represents a hydrogen atom or an alkyl group having a carbon number of 1-20, $R^{17}$-$R^{11}$ each independently represent a hydrogen atom, an alkyl group having a carbon number of 1-20, a hydroxyl group, an alkoxy group having a carbon number of 1-20 or a halogen group. Herein, the aforesaid $R^{17}$-$R^{21}$ represent $R^{17}$, $R^{18}$, ... and $R^{21}$.)

Further, preferable polymer block [B'] necessarily contains the aforesaid repeating unit [4], and provided with at least either one of repeating unit [5] represented by following formula (5) or repeating unit [6] represented by following formula (6). Further, a'>b', when mol fraction of repeating unit [4] in polymer block [A'] is a' and mol fraction of repeating unit [4] in polymer block [B'] is b'.

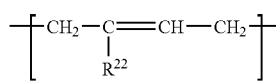

Formula (5)

(in the formula, $R^{22}$ represents a hydrogen atom or an alkyl group having a carbon number of 1-20.)

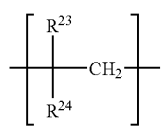

Formula (6)

(in the formula, $R^{23}$ represents a hydrogen atom or an alkyl group having a carbon number of 1-20, and $R^{24}$ represents a hydrogen atom or an alkyl group or an alkenyl group having a carbon number of 1-20)

Further block [B'] may contain repeating unit [Y] represented by following formula (Y).

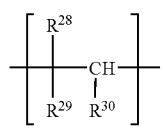

Formula (Y)

(in the formula, $R^{28}$ represents a hydrogen atom or an alkyl group having a carbon number of 1-20, $R^{29}$ represents a nitrile group, an alkoxycarbonyl group, a formyl group, hydroxycarbonyl group or a halogen group, or $R_{29}$ and $R_{30}$ may form an acid anhydride group or an imido group by bonding to each other.)

Further, a preferable block copolymer before hydrogenation is one having ratio ma'/mb' of preferably 5/95-95/5, more preferably 30/70-95/5 and most preferably 40/60-90/10, when a mol number of total repeating units constituting block [A'] is ma' and a mole number of total repeating units constituting block [B'] is mb'. The mechanical strength and heat resistance are superior when ma'/mb' is in the above range.

The molecular weight of a block copolymer before hydrogenation is preferably in a range of 12,000-400,000, more preferably 19,000-350,000 and most preferably 25,000-300,000 as a polystyrene (or polyisoprene) equivalent Mw which is measured by means of GCP employing THF as a solvent. Mechanical strength is decreased when Mw of a block copolymer is excessively small while hydrogenation degree is decreased when Mw of a block copolymer is excessively large.

The molecular weight distribution of a block copolymer before hydrogenation can be appropriately selected depending on the objective of the application, however, it is preferably not more than 5, more preferably not more than 4 and most preferably not more than 3, as a ration (Mw/Mn) of a polystyrene (or polyisoprene) equivalent molecular weight Mw to Mn, which are measured by means of GCP. The hydrogenation degree is improved when Mw/Mn is in this range.

The Tg of a block copolymer before hydrogenation may be suitably selected depending on the objective of the application, however, is preferably 70-150° C., more preferably 80-140° C. and most preferably 90-130° C., as a high temperature side value measured by means of DSC.

The reaction method and reaction form of performing hydrogenation of carbon-carbon unsaturated bonds in an unsaturated ring of such as an aromatic ring and a cycloalkene ring and unsaturated bonds in a main chain or a side chain, in the aforesaid block copolymer before hydrogenation, are not specifically limited, and can be performed according to commonly known methods. However, preferred is a hydrogenation method which can increase a hydrogenation degree as well as decrease a polymer chain cleaving reaction, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminum such as diethylaluminum chloride and ethylaluminum dichloride; and hydrogenated alkylaluminum such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenation catalysts can be utilized each alone or in combination of two or more types, and the using amount is generally 0.01-100 weight parts preferably 0.05-50 weight parts and more preferably 0.1-30 weight parts, per 100 weight parts of the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneously with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation degree of thus obtained hydrogenated compounds is preferably not less than 90%, more preferably not less than 95% and most preferably not less than 97%, based on 1H-NMR measurement, with respect to both of carbon-carbon unsaturated bonds of a main chain and a side chain, and carbon-carbon unsaturated bonds of an aromatic ring or a cycloalkene ring. Such as a low double refraction property and thermal stability of an obtained copolymer are deteriorated when the hydrogenation degree is low.

After finishing the hydrogenation reaction, the block copolymer can be recovered by such as a method in which the solvent is removed by means of direct drying after elimination of a hydrogenation catalyst from the reaction solution by means of such as filtration and centrifugal separation, and a method in which the hydrogenated compound solution is poured into a poor solvent for the hydrogenated compound to coagulate the hydrogenated compound.

In the aforesaid polymer according to this invention, various types of compounding ingredients can be appropriately blended. Compounding ingredients which can be blended in a block copolymer are not specifically limited and include stabilizers such as an antioxidant, a thermal stabilizer, a light fastness stabilizer, a weather-proofing stabilizer, a UV absorbent and an infrared absorbent; resin modifiers such as a sliding agent and a plastisizer; colorants such as dye and pigment; anti-static agents, non-flammable agents and fillers. These compounding ingredients can be utilized alone or in combination of two or more types, and the blending amount is selected in a range not disturbing the effects of this invention.

In this invention, it is preferable to blend an anti-oxidant, a UV absorbent and a light fastness stabilizer among the above compounding ingredients in a polymer. Anti-oxidants include such as phenol type anti-oxidants, phosphor type anti-oxidants and sulfur type anti-oxidants, and phenol type anti-oxidants, specifically alkyl-substituted phenol type anti-oxidants, are preferable among them. By blending these anti-oxidants, prevented can be coloring or strength decrease of a lens, due to oxidation deterioration at the time of molding, without deterioration of the transparency and heat resistance. These anti-oxidants can be utilized alone or in combination of two or more types, and the blending amount is selected in a range not disturbing the effects of this invention. It is preferably 0.001-5 weight parts and more preferably 0.01-1 weight parts, against 100 weight parts of the polymer.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methylphenyl)benzotriazole, 2-(2H-benzotriazole-2-il)-4-methyl-6-(3,4,5,6-tetrahydrophthalimidylmethyl)phenol, 2-(2H-benzotriazole-2-il)-4,6-bis(1-methyl-1-phenylethyl)phenol, 2-(2'-hydroxy-3'5'-di-tertiary-butylphenyl)benzotriazole, 2-(2'-hydroxy-3'-tertiary-butyl-5'-methylphenyl)-5-chlorobenzotriazole, 2-(2'-hydroxy-5'-tertiary-octylphenyl)benzotriazole, 2-(2'-hydroxy-3'5'-di-tertiary-amylphenyl)benzotriazole, 2-[2'-hydroxy-3'-(3",4",5",6"-tetrahydrophthalimidomethyl)-5'-methylphenyl]benzotriazole and 2,2'-methylenebis[4-(1,1,3,3-tetramethylbutyl)-6-(2H-benzotriazle-2-il)phenol]. Among them, preferable are 2-(2'-hydroxy-5'-methylphenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to such as heat resistance and low volatility.

Light fastness stabilizers include benzophenone type light fastness stabilizers, benzotriazole type light fastness stabilizers and hindered amine type light fastness stabilizers, and, in this invention, preferably utilized are hindered amine type light fastness stabilizers, with respect to transparency and an anti-coloring property of a lens. Among hindered amine type light fastness stabilizers (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability. Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, obtained can be lenses exhibiting excellent manufacturing stability, low gas generation and transparency by setting Mn of HALS in the above range.

Specific examples of such a HALS include high molecular weight HALS in which a plural number of piperidine rings are bonded via a triazine skeleton such as N,N',N",N'"-tetrakis-[4,6-bis-{butyl-(N-methyl-2,2,6,6-tetramethylpiperidine-4-il)amino}-triazine-2-il]-4,7-diazadecane-1,10-diamine, a polycondensation compound of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-diil}{(2,2,6,6-tetramethyl-4-piperidyl)imino}hexamethylene{(2,2,6,6-tetramethyl-4-piperidyl)imino}], a polycondensation compound of 1,6-hexadiamine-N,N'-bis(2,2,6,6-tetramethyl-4-piperidyl) and morphorine-2,4,6-trichloro-1,3,5-triazine and poly[(6-morphorino-s-triazine-2,4-diil)(2,2,6,6-tetramethyl-4-piperidyl)imino]-hexamethylene[((2,2,6,6-tetramethyl-4-piperidyl)imino];

high molecular weight HALS in which a piperidine rings are bonded via a ester bonding such as a polymerization compound of dimethylsuccinate and 4-hydroxy-2,2,6,6-tetramethyl-1-piperidineethanol, a mixed esterified compound of 1,2,3,4-butanetetracarboxylic acid, 1,2,2,6,6-pentamethyl-4-piperidinol and 3,9-bis(2-hydroxy-1,1-dimethyl)-2,4,8,10-tetraoxasupiro[5,5]undecane.

Among them, preferred are polymers having Mn of 2000-5000, such as a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}], a polymerization compound of dimethylsuccinate and 4-hydroxy-2,2,6,6-tetramethyl-1-piperidineethanol.

The blending amount of UV absorbent and HALS described above in a block copolymer according to this invention is preferably 0.01-20 weight parts, more preferably 0.02-15 weight parts and most preferably 0.05-10 weight perts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

Further, by blending a soft polymer having the lowest glass transition temperature of not higher than 30° C., it is possible to prevent turbidity under an environment of high temperature and high humidity for a long period without deteriorating such as transparency, heat resistance and mechanical strength.

Specific examples of the above soft polymers include olefin type soft polymer such as polyethylene, polypropyrene, ethylene-α-olefin copolymer and ethylene-propyrene-diene copolymer (EDPM); isobutylene type soft copolymers such as polyisobutylene, isobutylene-isoprene rubber and isobutylene-styrene copolymer; diene type soft copolymers such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene-block copolymer, isoprene-styrene-block copolymer and styrene-isoprene-styrene-block copolymer; silicon containing type soft polymers such as dimethyl polysiloxane and diphenyl polysiloxane; acryl type soft polymers such as polybutyl acrylate, polybutyl methacrylate and polyhydroxyethyl methacrylate; epoxy type soft polymers such as polyethyleneoxide, polypropyreneoxide and epichlorohydrine rubber; fluoride type soft polymers such as fluorovinyl type rubber and tetrafluoroethylene-propyrene rubber; other soft polymers such as natural rubber, polypeptide, protein, polyester type thermal plastic elastomers, vinylchloride type elastomers and polyamido type thermoplastic elastomers. These soft elastomer may be provided with a cross-linking structure or introduced with a functional group by a modification reaction.

Diene type soft polymers are preferred among the soft polymers described above, and, in particular, hydrogenated compounds, in which carbon-carbon unsaturated bonds of said soft polymers are hydrogenated, are superior with respect to rubber elasticity, mechanical strength, flexibility and dispersibility. The blending amount of a soft polymer differs depending on types of the compound, however, generally, the glass transition temperature or transparency may be decreased remarkably resulting in being unusable as a lens when the blending amount is too large. While turbidity of a molded product may generates under high temperature and high humidity when the blending amount is excessively small. The blending amount is preferably 0.01-10 weight parts, more preferably 0.02-5 weight parts and specifically preferably 0.05-2 weight parts against 100 weight parts of the block copolymer.

Next, temperature-affected changes of refractive index of light converging lens 3 relating to the present embodiment will be explained. The temperature-affected change of the refractive index is expressed by temperature coefficient A of the following expression by differentiating refractive index n with temperature t, based on Lorents-Lorenz equation.

$$A = \frac{(n^2+2)(n^2-1)}{6n}\left\{(-3\alpha) + \frac{1}{[R]}\frac{\partial [R]}{\partial t}\right\} \quad (1)$$

α: Coefficient of linear expansion
[R]: Molecular refraction

In the case of plastic materials, a contribution of the second term is generally small and can be ignored substantially, compared with the first term. For example, in the case of PMMA resin, coefficient of linear expansion α is $7 \times 10^{-5}$, and when it is substituted in the expression above, there is obtained $-1.2 \times 10^{-4}$ which agrees an actual measurement substantially. In the present embodiment, in this case, it is possible to make a contribution of the second term to be great substantially by dispersing microparticles, preferably inorganic microparticles, in resins, so that a change by linear expansion of the first term may be canceled. To be concrete, it is preferable that the change which has been about $-1.2 \times 10^{-4}$ in the past is controlled to be less than $10 \times 10^{-5}$ in an absolute value. The change that is preferably less than $8 \times 10^{-5}$, further preferably less than $6 \times 10^{-5}$ or $1.0 \times 10^{-6}$ is preferable as an optical design or as light converging lens 3.

Strictly speaking, a form of light converging lens 3 is also changed microscopically by changes of ambient temperatures, and thereby refracting efficiency (refracting power) is changed. If this change can be further canceled, it is extremely preferable as light converging lens 3. In other words, though a wavelength of a laser beam emitted from semiconductor laser oscillator 1 is made to be constant independently of an ambient temperature, if the refractive index of a material of the light converging lens 3 is lowered slightly with a rise of the ambient temperature, fluctuations of a focal length can be prevented and fluctuations of a focal length can be prevented and fluctuations of connecting efficiency for optical fiber 6 can be prevented, because the refractive index of the light converging lens 3 is lowered by an amount equivalent to an amount of increase of a focal length caused by expansion of the light converging lens 3. Incidentally, as a different application, when a convex lens and a concave lens are combined for temperature correction despite an original desire to achieve an optical system wherein two convex lenses are combined, it becomes possible to combine two convex lenses as desired. When obtaining the optical element, namely, the light converging lens 3 as stated above, it is preferable to make a value of the aforesaid expression (1) to be as follows.

$$0 < A < 8 \times 10^{-4} \quad (2)$$

Next, there will be explained a specific method for molding light converging lens 3 relating to the present embodiment. AS described earlier, there is known a method to make particles to have electric charges concerning a technology to disperse particles in plastic resins. For example, pellet-shaped plastic resins are filled in a chamber, then, particles are poured in the chamber to be dispersed, and the inside of the chamber is heated so that plastic resins are melted. By doing this, dispersed particles are dispersed in melted plastic resins. In this case, it is possible to stir, or to apply electric field/magnetic field or to apply supersonic waves, to prevent precipitation.

When conducting injection molding for melted plastic resins, a method to add particles by the use of an in-line mixer can be implemented preferably. Since mixing is carried out in a spiral form on the line, the state of dispersion can be created preferably. In this case, if plastic resins having therein dispersed microparticles are cooled and solidified once, and then are melted again to be subjected to injection molding, the state of dispersion is changed or microscopic blue tarnishes are caused on resins around the particle by reheating and repeated melting. When blue tarnishes are caused, in particular, light transmittance is lowered depending on a region of the blue tarnish, which sometimes results in an occasion where the resins cannot be used as an optical element. Accordingly, if the plastic resins are melted and particles are dispersed, it is preferable to obtain moldings while keeping the melted and dispersed state. Namely, it is preferable that particles each being in a size of not more than 30 nanometers in terms of diameter are dispersed in melted plastic resins, and they are made to flow in a metal mold while keeping their melted state to obtain moldings.

An optical element of this invention comprises plastic resin and microparticles as mother materials, and the mixing method is not specifically limited. That is, applied can be any methods such as a method in which plastic resin and microparticles are prepared each independently followed by mixing the both, a method in which microparticles are prepared in the presence of a plastic having been prepared in advance and a method in which both of plastic resin and microparticles are simultaneously prepared. Specifically, for example, preferably listed is a method in which two solutions, a solution in which plastic resin is dissolved and a dispersion in which microparticles are homogeneously dispersed, are mixed uniformly and the mixed solution is poured into a solution having a poor solubility for the plastic resin to prepare an objective material composition, however, this invention is not limited thereto.

In an optical element of this invention, the mixing degree of plastic resin and microparticles is not specifically limited, however, being mixed uniformly is preferred to exhibit the effects of this invention more efficiently. When the mixing degree is insufficient, possibly caused may be an effect to optical characteristics, in particular, such as a refractive index, an Abbe's number and light transmittance, as well as an effect to manufacturing properties such as a thermoplastic property and a fusion molding property. The degree of mixing is considered to be affected by the preparation method, and it is important to select the method in sufficient consideration of characteristics of plastic resin and microparticles utilized. To uniformly mix the both plastic resin and microparticles, preferably employed in this invention can be a method to directly mix plastic resin and microparticles.

Next, preferable metal mold for molding an optical element of the present of the invention is explained. A metal mold can have a shape to transfer a microscopic shape including above-mentioned optical path difference providing structure, an aspheric surface shape or those combination.

Moreover, the metal mold having a shape which makes a resin flow in the metal mold (fluidity) at the time of molding and transferring with the metal mold and having a fissility (mold-release characteristic) at the time of picking out a cast from the metal mold is required.

Then, preferable metal mold is provided by forming fundamental shape in metal core material (steel or stainless material) and being applied metal plating to its surface. A thickness of the metal plating layer can be determined suitably among 10-100 μm. Moreover, the optical path difference providing structure is preferably provided by cutting the plated layer.

Moreover, a protection coat using diamond-like carbon (DLC) or other means can be provided for improvement in a mold-release characteristic or mold protection.

Thus, it is preferable to injection mold the plastic resin in which particles with a diameter of 30 nm or less are dispersed using the molding die such that the plated layer is formed on the metal core material.

Second Embodiment

A semiconductor laser light source device relating to Second Embodiment is a variation of the device in the First Embodiment, and the structure in appearance of the semiconductor laser light source device is substantially the same as that of the device in the First Embodiment. However, in the Second Embodiment, semiconductor laser oscillator 1 is not cooled by force, and therefore, a wavelength of a laser beam emitted from the semiconductor laser oscillator 1 is shifted to the longer wavelength side as an ambient temperature rises.

Figure 2:
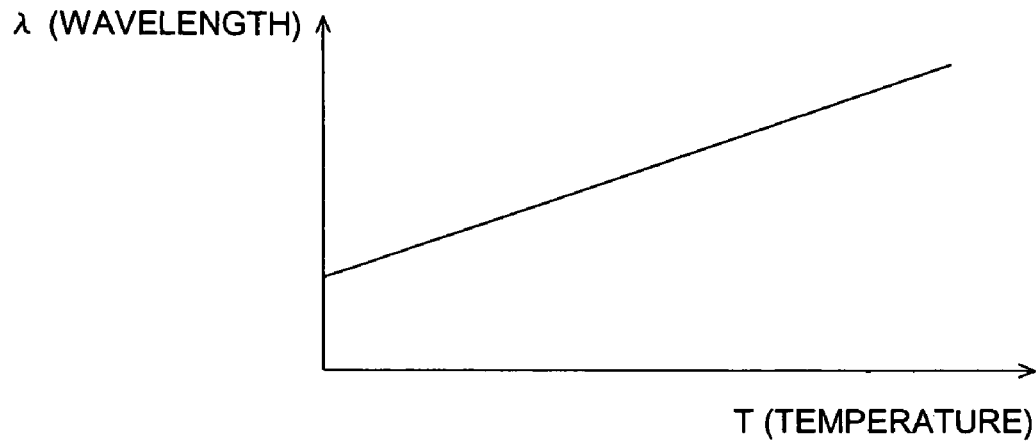
FIGS. 2(a)-2(c) show diagrams for illustrating the Second Embodiment.
Figure 2:
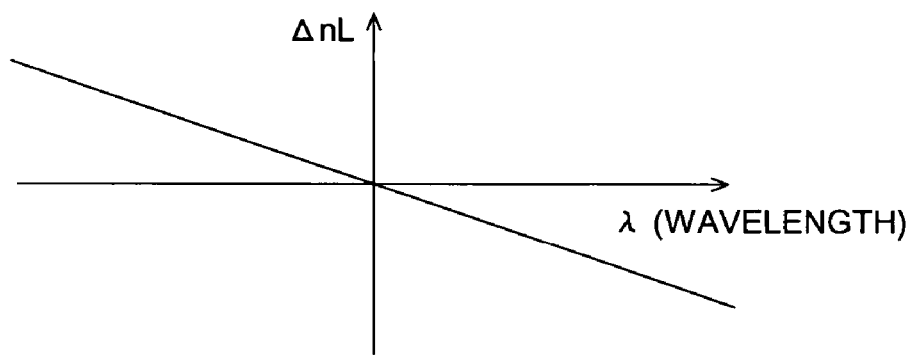
Figure 2:
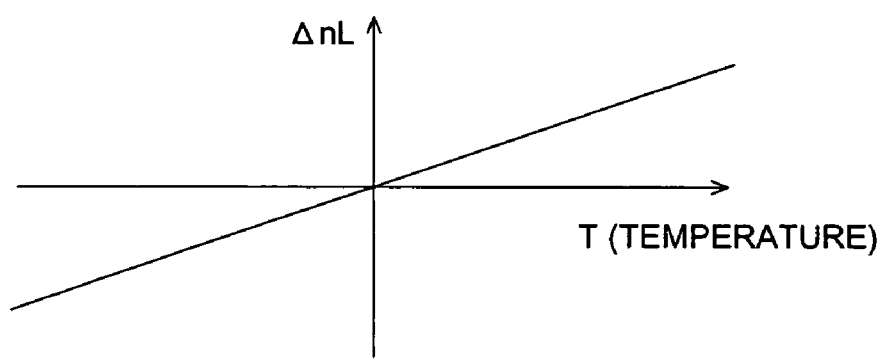

FIG. 2(a) shows an example of temperature-dependency of an oscillation wavelength of the semiconductor laser oscillator 1. As is shown, the oscillation wavelength is shifted to the longer wavelength side as a temperature rises. FIG. 2(b) shows apparent change $\Delta nL$ of the refractive index in the case where a wavelength of a laser beam entering light converging lens 3 is fluctuated. Further, FIG. 2(c) shows change $\Delta nT$ of the refractive index resulted from a rise of an ambient temperature of light converging lens 3. In this case, first change component $\Delta nL$ of the refractive index of light converging lens 3 caused by wavelength fluctuations resulted from changes of ambient temperatures and second change component $\Delta nT$ of the refractive index of light converging lens 3 caused by a rise of ambient temperature of light converging lens 3 are opposite each other in terms of direction and are substantially the same in terms of an absolute value, which results in that a position and a size of a light-converged spot of light converging lens 3 are kept to be in a stable condition on an end surface of optical fiber 6. Incidentally, when apparent refractive index fluctuation $\Delta nL$ of light converging lens 3 corresponding to wavelength changes caused by ambient temperature changes of semiconductor laser oscillator 1 comes to about $-1.5 \times 10^{-3}$ (1/° C.), for example, refractive index change $\Delta nL$ caused by ambient temperature changes of light converging lens 3 may be made to be about $+1.5 \times 10^{-3}$ (1/° C.). Due to this, the connecting efficiency of a laser beam emitted from semiconductor laser oscillator 1 to the light converging lens 3 may be made stable constantly, by keeping the balance between a shift of focus caused by temperature changes of semiconductor laser oscillator 1 and a shift of focus caused by temperature changes of light converging lens 3.

Third Embodiment

A semiconductor laser light source device relating to Third Embodiment is a variation of the device in the First Embodiment or the Second Embodiment. However, on the device of the Third Embodiment, an optical path difference providing structure including any one of a diffractive structure that generates an image-forming effect by utilizing a diffraction phenomenon, a phase difference providing structure for generating a certain light-converging effect by a phase difference and a multi-level structure that shifts plural partial surfaces obtained by dividing an optical surface into ring-shaped zonal state in the optical axis direction by a microscopic amount.

Figure 3:
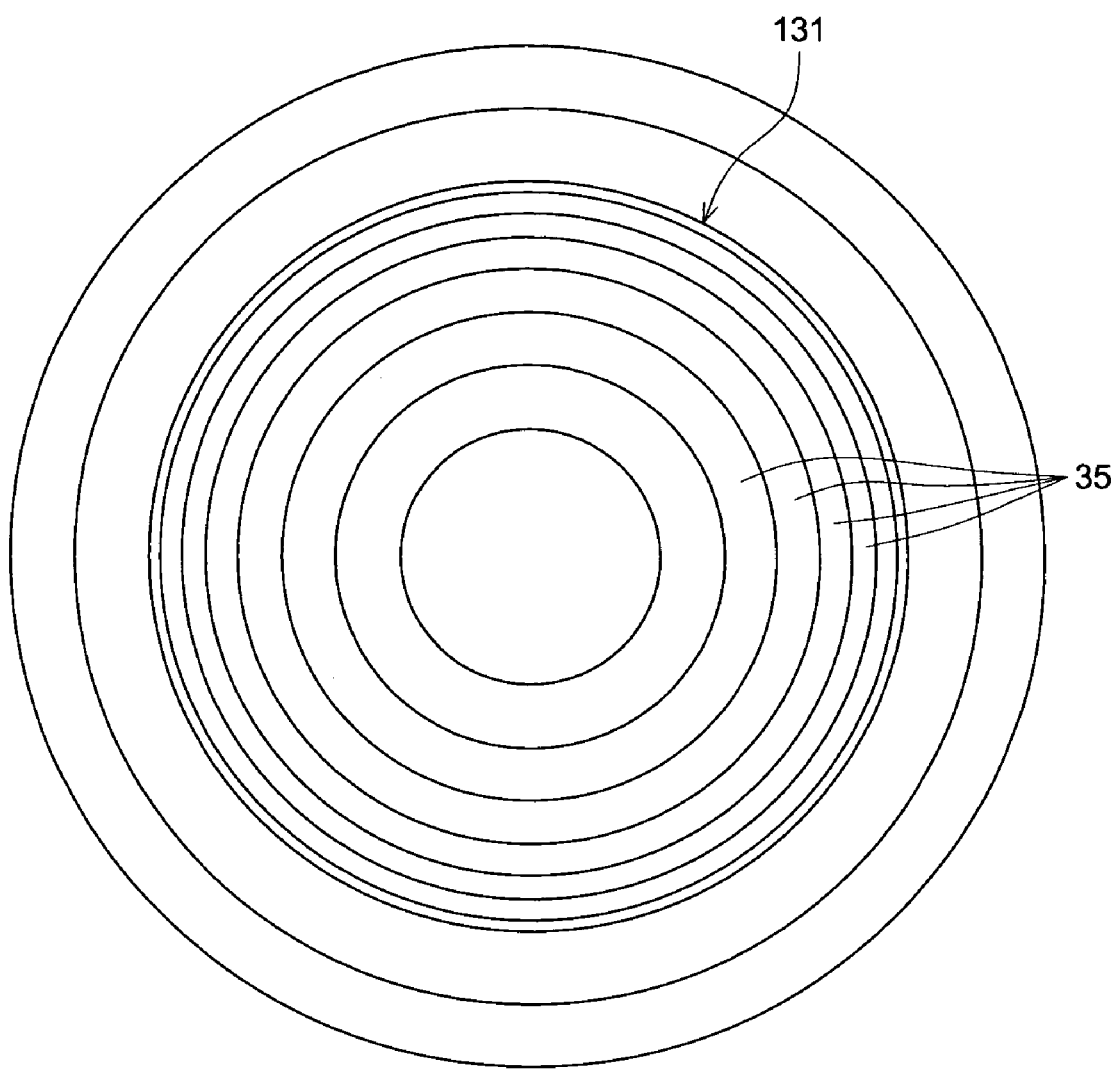
FIG. 3 is a plane view of a light converging lens in the Second Embodiment.

FIG. 3 is a plane view of light converging lens 103 wherein ring-shaped zones 135 are formed on the surface of optical surface 31 on one side (however, the ring-shaped zones 135 are shown in exaggeration in FIG. 3). When the ring-shaped zones 135 of this kind have a diffractive effect, the surface of each ring-shaped zone has a microscopic difference in level (step) of about several microns corresponding to the surface of an adjoining ring-shaped zone and to a wavelength of a laser beam. With respect to the surface of adjoining ring-shaped zones 135, the lens surface is formed so that a desired curved surface may be formed as a total surface. Owing to this, light converging lens 13 forms images on end portion of incidence 60 of optical fiber 6 (see FIG. 1) through its refracting operations as its spherical lens or aspheric lens. Further, it is also possible to form images on end portion of incidence 60 of optical fiber 6 through diffraction of laser beams by many ring-shaped zones, even by the concentric-circle-shaped structure of the ring-shaped zones 135, and focal lengths can be made to agree with each other accurately with two or more wavelengths, for example, and chromatic aberration can be corrected.

Incidentally, an area for forming ring-shaped zones on the upper surface of light converging lens 103, for example, may be made to correspond to light distribution on the beam section of semiconductor laser light source, by changing the aforesaid form of concentric circles to the form of concentric ovals on the ring-shaped zones 135.

Fourth Embodiment

An application to an optical pickup relating to Fourth Embodiment of the invention, namely, to an optical pickup of a Super-RENS system will be explained next.

In this system, a known one (for example, see TOKKAI No. 2001-305325 and TOKKAIHEI No. 8-179198) can be used as an optical pickup device itself, but a portion of an optical detecting device including a sensor and a drive detecting circuit is of the structure capable of detecting near field light.

When plastic resins relating to the invention, namely, those used for molding light converging lens 3 and light converging lens 103 in the First Embodiment and Second Embodiment are used for at least one of optical elements used for the optical system including a light-converging optical system such as a beam shaping element, a collimator, a beam expander, a coupling lens, a sensor lens and an objective lens, an optical pickup device wherein optical efficiencies are not changed by temperature changes can be obtained.

EXAMPLE

In the following, a resin composition utilized in an optical element of this invention will be specifically explained referring to an example, however, embodiments of this invention are not limited thereto.

Example 1

<Preparation of Inorganic Microparticles 1>

In an atmosphere of nitrogen, a solution in which 2.5 g of pentaethoxy niobium was added into 32.31 g of 2-methoxyethanol was prepared. A mixed solution comprising 0.35 g of water and 34.45 g of 2-methoxyethanol was added drop-wise into the above solution while being stirred. After the resulting solution was stirred for 16 hours at room temperature, it was concentrated so as to make an oxide concentration of 5 weight % resulting in preparation of $Nb_2O_5$ dispersion. The particle diameter distribution of obtained $Nb_2O_5$ dispersion was measured by means of a dynamic confusion method, and the mean particle diameter was 6 nm. These particles were designated as inorganic microparticles 1.

<Preparation of Inorganic Microparticles 2>

In an atmosphere of nitrogen, a solution in which 2.0 g of pentaethoxy niobium was added into 16.59 g of 2-methoxyethanol was prepared. A mixed solution comprising 0.26 g of lithium hydroxide hydrate and 18.32 g of 2-methoxyethanol was added drop-wise into the above solution while being stirred. After the resulting solution was stirred for 16 hours at room temperature, it was concentrated so as to make an oxide concentration of 5 weight % resulting in preparation of $LiNbO_3$ dispersion. The particle diameter distribution of obtained $LiNbO_3$ dispersion was measured by means of a dynamic confusion method, and the mean particle diameter was 5 nm.

Into this dispersion of 100 g, 300 g of methanol and nitric acid aqueous solution of 1 mol % were added, and a mixed solution of 100 g of methanol and 6 g of cyclopentyl trimethoxysilane were further added over a period of 60 minutes while being stirred at 50° C., followed by 2 hours of stirring. The obtained transparent dispersion was suspended in ethyl acetate, which was subjected to centrifugal separation to prepare white micro-particle powder. This powder had a mean particle diameter of 6 nm according to TEM observation, and was designated as microparticles 2.

<Preparation of Resin Composition>

<Preparation of Resin Composition 1>

Dispersion of inorganic microparticles 1 of 6 g were added drop-wise into 10 g of a chloroform solution, in which 10 weight % of resin (3) described in foregoing Table 1 was dissolved, while stirring at ordinary temperature. Obtained colorless transparent liquid was sedimented in a mixed solution, comprising equivalent volume of methanol and water by use of a homogenizer, resulting in preparation of resin composition in which inorganic particles are dispersed at 25% against resin (3).

<Preparation of Resin Composition 2>

By utilizing a powder of inorganic particles 2 and a cyclohexane solution in which 10 weight % of resin (2) were dissolved, resin composition 2, in which 15 weight % against resin (2) of inorganic particles were dispersed, was prepared in a similar manner to resin composition 1.

TABLE 2

| | Resin | Inorganic microparticles Type | Content (weight %) |
|---|---|---|---|
| Resin composition 1 | Resin (3) | Inorganic microparticles 1 | 30 |
| Resin composition 2 | Resin (2) | Inorganic microparticles 2 | 15 |

<Evaluation of Refractive Index>

Resin compositions 1 and 2 were heating molded to prepare test plates of 0.5 mm thick respectively, refractive indexes of which were measured varying the temperature over 10-30° C. by use of an Abbe's refractometer (DR-M2, produced by Atago Co., Ltd.) at a wavelength of 500 nm, and variation of the refractive index with temperature dn/dt was determined. Further, as comparisons, dn/dt with respect to resin (3) and resin (2) without mixing inorganic microparticles was also determined in a similar manner. The results are shown in Table 3.

<Evaluation of Transmittance>

Resin compositions 1 and 2 were heating molded to prepare test plates of 3 mm thick respectively. Light transmittance of each sample was measured by use of Turbidity Meter T-2600DA, produced by Tokyo Denshoku Co., Ltd. according to a method of ASTM D1003. The results are shown in Table 3.

TABLE 3

| | dn/dt ($10^{-6}$/K) of resin itself | dn/dt ($10^{-6}$/K) of resin composition | Transmittance (%) |
|---|---|---|---|
| Resin composition 1 | −114 (resin (3)) | −57 | 88 |
| Resin composition 2 | −110 (resin (2)) | −40 | 90 |

What is claimed is:

1. An semiconductor laser light source apparatus comprising: a semiconductor laser oscillator for emitting a laser beam; and a lens for transmitting the laser beam emitted by the semiconductor laser oscillator, wherein the lens comprises a light transparent material in which microparticles are dispersed into a plastic resin and have sizes of the transmitting laser beam wavelength or below, wherein sizes and densities of the microparticles for dispersing into the plastic resin are regulated so that a temperature coefficient of a refractive index of the light transparent material has a predefined value, a focal point of the lens is shifted by a first factor which is heat deformation and refractive index variation caused by the lens temperature variation and a second factor which is an oscillating wavelength change of the semiconductor laser oscillator caused by a temperature variation thereof, and the temperature coefficient is regulated so that the focal point shift caused by the first factor is in an opposite direction to the focal point shift caused by the second factor.

2. The semiconductor laser light source apparatus of claim 1 comprising:

a lens holder for housing the lens and the semiconductor laser oscillator therein; and a positioning member for being arranged on an inner wall of the lens holder, wherein the positioning member positions the lens and the semiconductor laser oscillator in the lens holder.

3. The semiconductor laser light source apparatus of claim 1, wherein the microparticles have diameters of 30 nm or below.

4. The semiconductor laser light source apparatus of claim 1, wherein volume ratio of the plastic resin and the microparticles in the light transparent material are in a range of 9:1 to 2:3.

5. The semiconductor laser light source apparatus of claim 1, wherein the temperature coefficient of the refractive index of the light transparent material is fixed so that the focal point shift caused by a combination of the first factor and the second factor is 40 nm or below.

6. The semiconductor laser light source apparatus of claim 5, wherein the temperature coefficient of the refractive index of the light transparent material is fixed so that the focal point shift caused by the first factor cancels out the focal point shift caused by the second factor.

7. The semiconductor laser light source apparatus of claim 1 further comprising the fixing structure to fix the incident end position of an optical fiber, wherein the lens couples a laser beam from the semiconductor laser oscillator onto the incident end of the optical fiber.

8. The semiconductor laser light source apparatus of claim 1, wherein the lens comprises an optical functional having an optical path difference providing structure.

9. The semiconductor laser light source apparatus of claim 8, wherein the optical path difference providing structure comprising a diffractive structure, phase difference providing structure or multilevel structure.

10. The semiconductor laser light source apparatus of claim 1, wherein the microparticles dispersed in the plastic resin are inorganic material.

11. The semiconductor laser light source apparatus of claim 10, wherein the inorganic material is an oxide.

12. The semiconductor laser light source apparatus of claim 11, wherein the oxide is in a saturated oxidation state.

13. The semiconductor laser light source apparatus of claim 1, wherein the light transparent material is made by adding antioxidant into the plastic resin.

14. The semiconductor laser light source apparatus of claim 1, wherein the lens has a refractive surface comprising an aspherical surface.

* * * * *